(12) United States Patent
Kirejczyk

(10) Patent No.: US 6,536,164 B1
(45) Date of Patent: Mar. 25, 2003

(54) DOOR MODULE HAVING STRUCTURAL CARRIER

(75) Inventor: Juliusz Kirejczyk, Newmarket (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/936,274

(22) PCT Filed: Mar. 9, 2000

(86) PCT No.: PCT/CA00/00241

§ 371 (c)(1),
(2), (4) Date: Sep. 10, 2001

(87) PCT Pub. No.: WO00/53446

PCT Pub. Date: Sep. 14, 2000

(51) Int. Cl.[7] .................................................. B60J 5/04
(52) U.S. Cl. ............................................ 49/502; 49/352
(58) Field of Search .................... 49/502, 348, 349, 49/352; 296/146.5, 146.7

(56) References Cited

U.S. PATENT DOCUMENTS

| | | |
|---|---|---|
| 4,743,062 A | 5/1988 | McLaren et al. |
| 4,785,585 A | 11/1988 | Grier et al. |
| 4,924,630 A | 5/1990 | Lomasney et al. |
| 5,095,659 A | 3/1992 | Benoit et al. |
| 5,251,403 A | 10/1993 | Compeau et al. |
| 5,367,832 A | 11/1994 | Compeau et al. |
| 5,425,206 A | 6/1995 | Compeau et al. |
| 5,433,041 A | 7/1995 | Filippi |
| 5,535,553 A | 7/1996 | Staser et al. |
| 5,548,930 A | 8/1996 | Morando |
| 6,185,872 B1 * | 2/2001 | Seeberger et al. ............ 49/502 |
| 6,231,112 B1 * | 5/2001 | Fukumoto et al. ............ 49/502 |
| 6,354,652 B1 * | 2/2002 | Arquevaux et al. ...... 296/146.5 |
| 6,367,202 B1 * | 4/2002 | Reed et al. .................... 49/502 |
| 6,381,906 B1 * | 5/2002 | Pacella et al. ................ 49/502 |

* cited by examiner

*Primary Examiner*—Jerry Redman
(74) *Attorney, Agent, or Firm*—Clark Hill PLC

(57) ABSTRACT

A vehicle door module has a hardware sub-module and a trim sub-module. The hardware sub-module includes a structural carrier plate containing hardware mounting surfaces. The carrier plate has an upper body panel and a bifurcated lower body portion comprising two legs extending from the upper body panel in opposite directions. The door hardware is mounted on the mounting surfaces. A window regulator assembly is mounted on the structural carrier plate. The trim sub-module is mounted to the hardware sub-module. The trim sub-module has a trim panel, a water barrier film and a wiring harness. The water barrier film is contoured to extend about and seal a periphery of the trim panel. A portion of the wire harness is sealed to the water barrier and connectors of the wiring harness extend from the trim sub-module at predetermined locations. The carrier plate is sized to be fitted in both a long low profile door and a short high profile door while the trim sub-module is customized to fit onto one of the door styles.

13 Claims, 5 Drawing Sheets

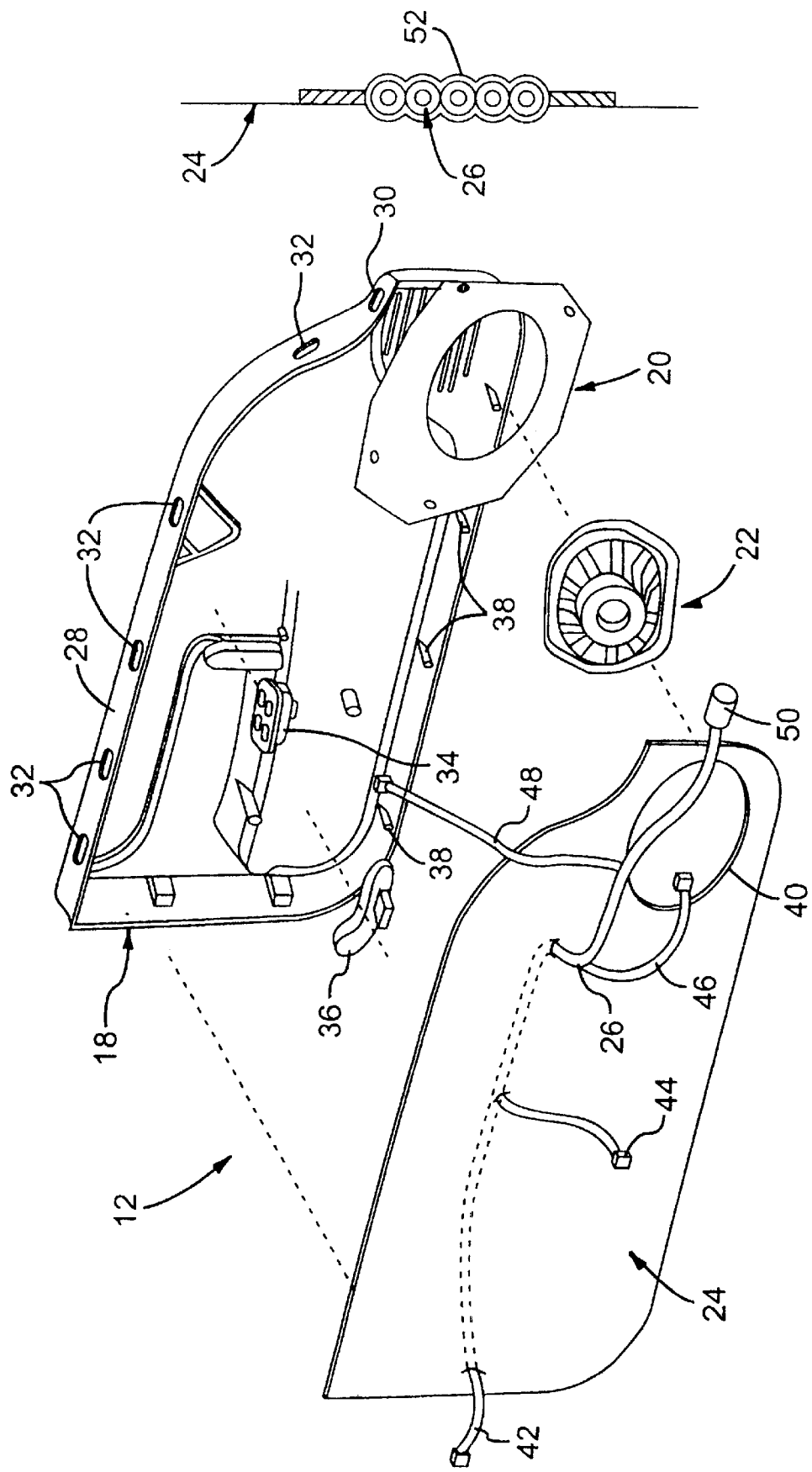

DOOR MODULE HAVING STRUCTURAL CARRIER

FIELD OF INVENTION

This invention relates to an improved door module having a structural carrier. In particular, this invention relates to a door module having a structural carrier which minimizes the tooling required for utilizing the door modules on different vehicle models.

BACKGROUND OF INVENTION

The automotive parts supply industry has been evolving towards the supply of not merely individual parts but the supply of modules. Modules have the advantage of providing a greater number of parts and functionality into a single module while being easier and quicker to install on the assembly line.

Door modules have been proposed since a door frame is easily separated from the functional and aesthetic aspects of the door, thus making the vehicle door particularly attractive for modular assembly. An example of such a system is described in U.S. Pat. No. 5,095,659.

However, automotive equipment manufacturers have also been evolving towards several vehicles derived from a single platform. Current door module designs have been designed specifically for a particular vehicle and must be modified or redesigned for other vehicles, even on the same platform. For example, in U.S. Pat. Nos. 5,251,403; 5,367,832; 5,425,206 and 5,535,553, a one piece plastic frame is provided to support the door hardware. However, the plastic frame must be customized for each vehicle and door type adding tooling and molding costs to each vehicle.

SUMMARY OF THE INVENTION

The disadvantages of the prior art may be overcome by providing a door module having a structural carrier which provides a common element for door modules which can be applied to several vehicle door types.

It is desirable to provide a door module having a vapor barrier which incorporates a wiring harness thereby minimizing the need for coating or wrapping the wires.

It is desirable to provide a door module having a structural carrier plate having a base size which can be adapted to fit any size door, thereby enabling the use of common components for different door types and different vehicle models.

According to one aspect of the invention, there is provided a vehicle door module having a hardware sub-module and a trim sub-module. The hardware sub-module includes a structural carrier plate containing hardware mounting surfaces. The carrier plate has an upper body panel and a bifurcated lower body portion comprising two legs extending from the upper body panel in opposite directions. Door hardware is mounted on the mounting surfaces. A window regulator assembly is mounted on the structural carrier plate. The trim sub-module is mounted to the hardware sub-module. The trim sub-module has a trim panel, a water barrier film and a wiring harness. The water barrier film is contoured to extend about and seal a periphery of the trim panel. A portion of the wire harness is sealed to the water barrier and connectors of the wiring harness extend from the trim sub-module at predetermined locations. The carrier plate is sized to be fitted in both a long low profile door and a short high profile door while the trim sub-module is customized to fit onto only one of the door.

DESCRIPTION OF DRAWINGS

In drawings which illustrate an embodiment of the invention,

FIG. 3 is an exploded perspective view of the trim sub-module for the door module embodiment of FIG. 1;

FIG. 4 is an end sectional view of a wire harness of the door module embodiment of FIG. 1;

DESCRIPTION OF THE INVENTION

Figure 1:
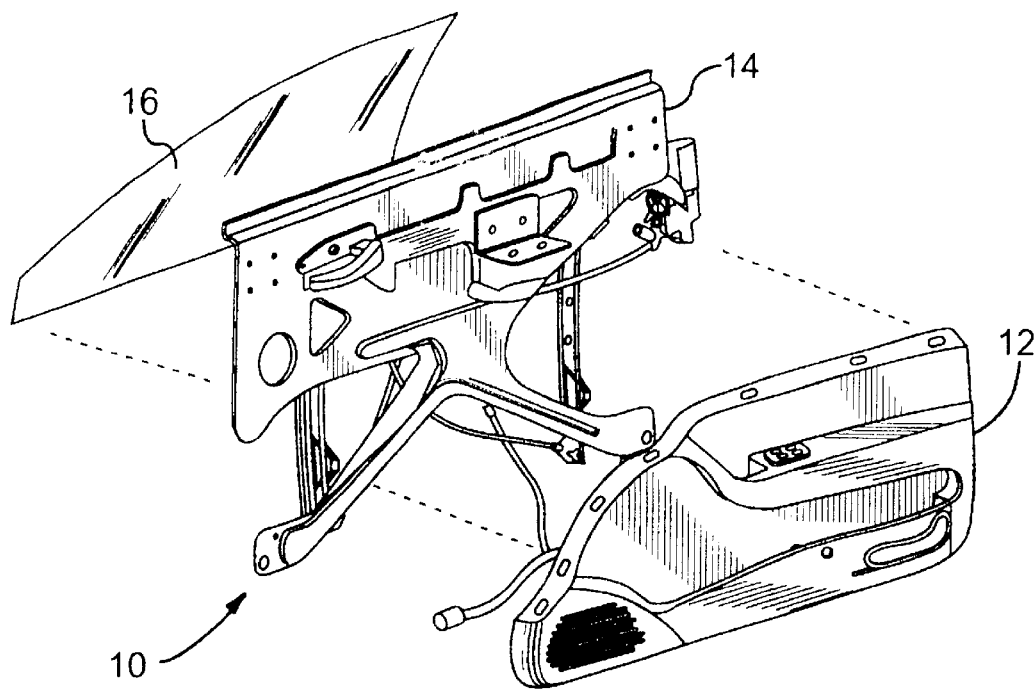
FIG. 1 is an exploded perspective view of a door module of the present invention.

Referring to FIG. 1, there is illustrated a door module 10 of the present invention. Door module 10 generally comprises a lower trim sub-module 12, a hardware sub-module 14 and a glass 16.

Figure 2:
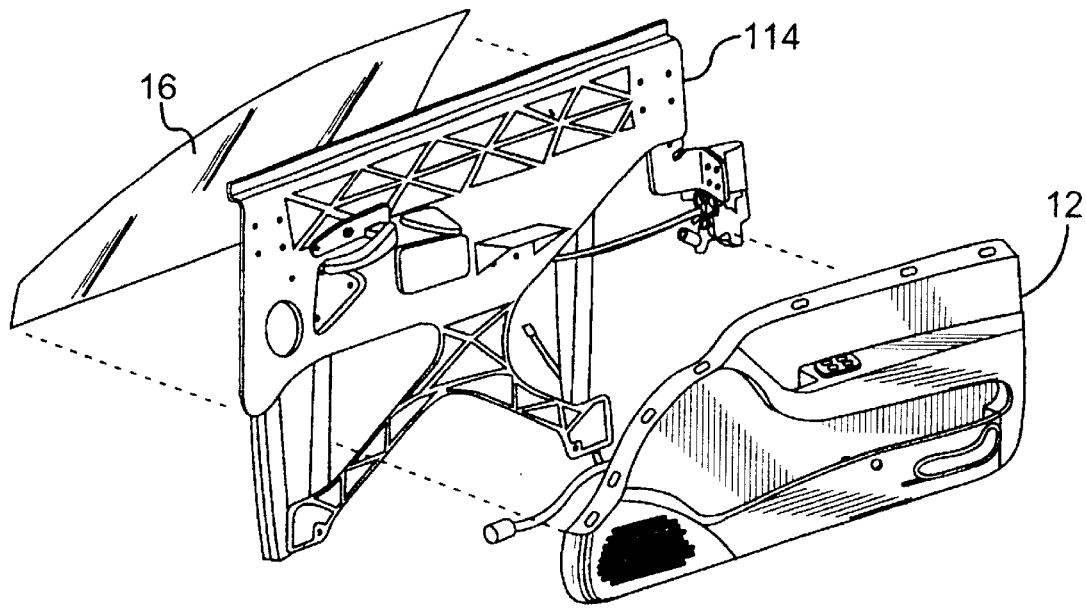
FIG. 2 is an exploded perspective view of a second embodiment of a door module of the present invention.

Referring to FIG. 2, a second embodiment of the present invention is illustrated. In the second embodiment generally comprises a lower trim sub-module 12, a hardware sub-module 114 and a glass 16. Hardware sub-module 114 is identical to sub-module 14 except that many of the components of the hardware sub-module are integrated.

Referring to FIG. 3, the lower trim sub-module 12 is illustrated. Trim sub-module 12 generally comprises a lower trim panel 18, a speaker mounting bracket 20, a speaker 22 a water barrier 24 and a wire harness 26.

The lower trim panel 18 is made by any conventional process, including U.S. Pat. Nos. 5,387,390; 5,397,409; and 5,571,355. The lower trim panel 18 has an upper flange 28 and a speaker mounting area 30. Flange 28 has a series of access holes 32 for receiving clips to secure the upper trim panel as will be discussed further on. Speaker mounting bracket 20 fastens to the lower trim panel 18 at the speaker mount area 30. Speaker 22 mounts to the speaker mounting bracket 20 in a conventional manner. The attachment to the lower trim panel 18 at this stage is primarily for positioning and locating purposes. The trim panel 18 supports the speaker 22 during shipping and assembly. A switch panel 34 and a courtesy light 36 are mounted to the interior of the lower trim panel 18. The trim panel 18 has a series of fasteners 38 extending outwardly for joining the door module 10 to a door frame.

Water barrier 24 is a flexible sheet of water impermeable material such as polypropylene or other synthetic plastic material. The sheet is contoured to extend about the periphery of the lower trim panel 18. The water barrier 24 has a speaker hole 40 which fits about the speaker 22 and allows the speaker 22 to extend therethrough. Water barrier 24 seals about the periphery of the lower trim panel 18 presenting a water barrier preventing moisture intrusion.

The wire harness 26 comprises a series of wires for electrically connecting the electrical components of the door, such as the power latch, power window, speaker, power mirror and courtesy lights. The wires include a door latch connection 42, a window regulator connection 44, a speaker connection 46, a mirror connection 48 and a main connection 50. Each of the connections, 42, 44, 46, 48 and 50 exit the water barrier 24 at convenient locations. The wires on the moisture side of the water barrier 24 are wrapped or coated in a conventional manner. On the dry side, the wires can be mounted to the inner face of the water barrier 24 and then covered by an impermeable cover sheet 52. The cover sheet 52 is then sealed to the water barrier 24 to substantially seal the wires of harness 26. The water barrier 24 carries and seals the wire harness 26, minimizing the amount of wrap or coating for the wire harness 26.

Figure 5:
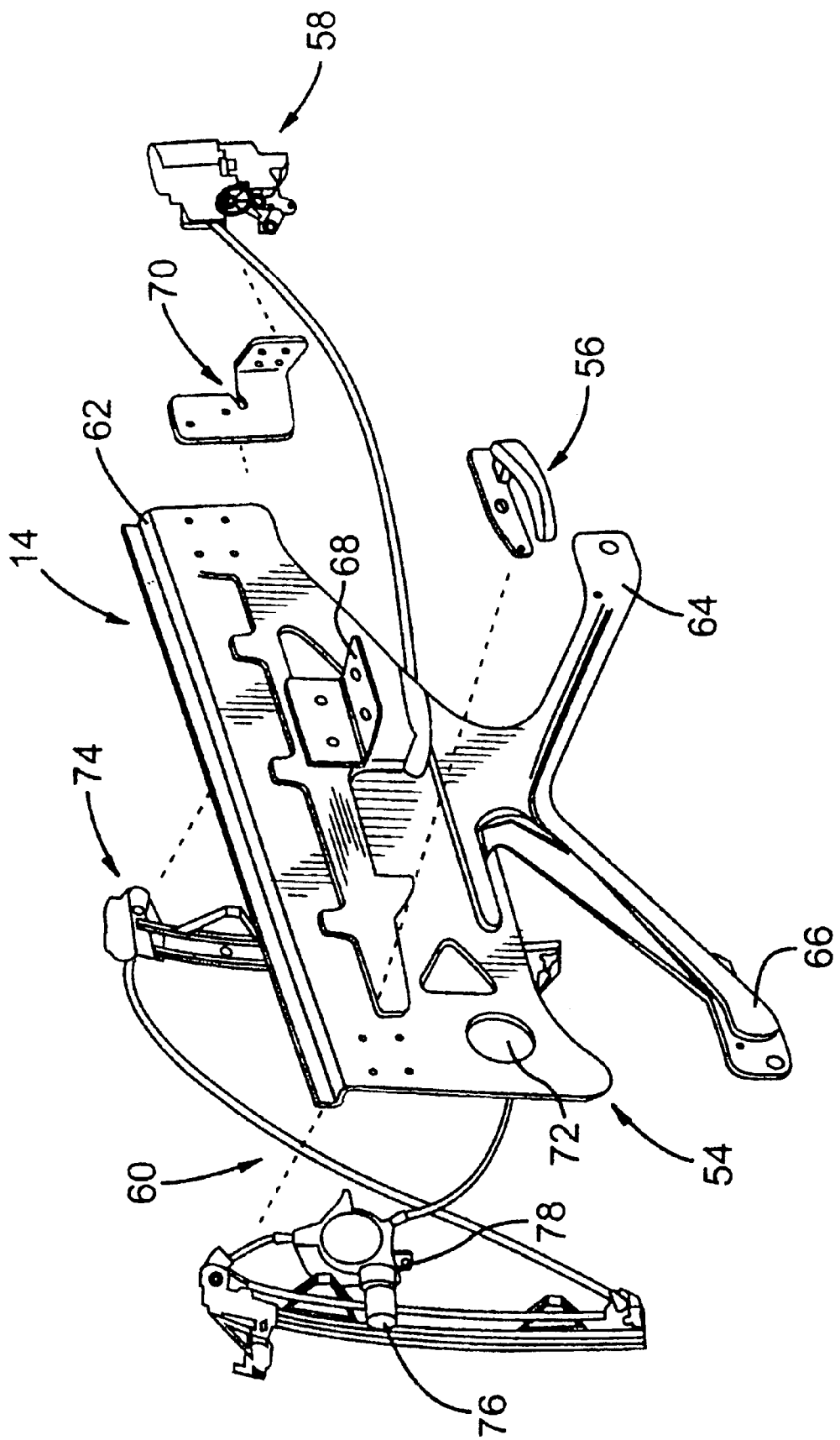
FIG. 5 is an exploded perspective view of the door hardware sub-module for the door module embodiment of FIG. 1.

Referring to FIG. 5, the hardware sub-module 14 is illustrated. The hardware sub-module 14 generally comprises a structural carrier plate 54, an inside door release handle 56, a latch 58 and a window regulator assembly 60. Structural carrier plate 54 is preferably a stamped sheet metal plate.

Carrier plate 54 generally has an upper body panel 62 and a bifurcated lower body portion comprising two L-shaped legs 64, 66. Legs 64, 66 extend from a central region of the upper panel 62 and extend in opposite directions. The upper panel 62 has mounting surfaces having holes for mounting on the inner face thereof, the door release handle 56, arm rest support bracket 68 and latch bracket 70. Latch 58 is mounted to latch bracket 70 in a conventional manner. Upper panel 62 has an aperture 72 which allows access for the mirror connection 48. Upper panel 62 has embossed areas for improving the rigidity thereof.

As is apparent, the entire upper panel 62 could be utilized to locate and mount door hardware. If the base size carrier plate 54 is utilized in different door types or different vehicles, the door hardware could be mounted anywhere on the upper panel 62 as desired. Additionally, custom brackets, such as latch bracket 70, can be modified to fit different vehicles and door types.

The window regulator 60 is mounted on the outer face of the carrier plate 54. Window regulator 60 has two rails 74, 76 which are fastened to the carrier plate 54. Window regulator 60 also has a motor 78 which electrically connects to connection 44. Glass 16 is then mounted to the window regulator 60 in a conventional manner.

Referring back to FIG. 2, the carrier plate 114 is illustrated. The carrier plate 114 is preferably made from a magnesium alloy, although the carrier plate 114 could be made from an injection molded plastic. The magnesium alloy has the advantage that the rails 74, 76 of the window regulator assembly 60 can be cast as an integral part of the structural carrier plate 114. The upper region is reinforced using conventional ribbing structures.

Conveniently, an arm rest support and a belt structure adjacent the window opening may also be integrally formed during casting of the carrier plate 114.

The trim sub-module 12 and the hardware sub-module 14 can be assembled separately and then fastened together as a shipping unit for delivery to the assembly line. The trim sub-module 12 is presented to the hardware sub-module 14 or 114 and then fastened in a conventional manner. Speaker bracket 20 can be fastened directly to the leg 66 of the carrier plate 54.

Figure 6:
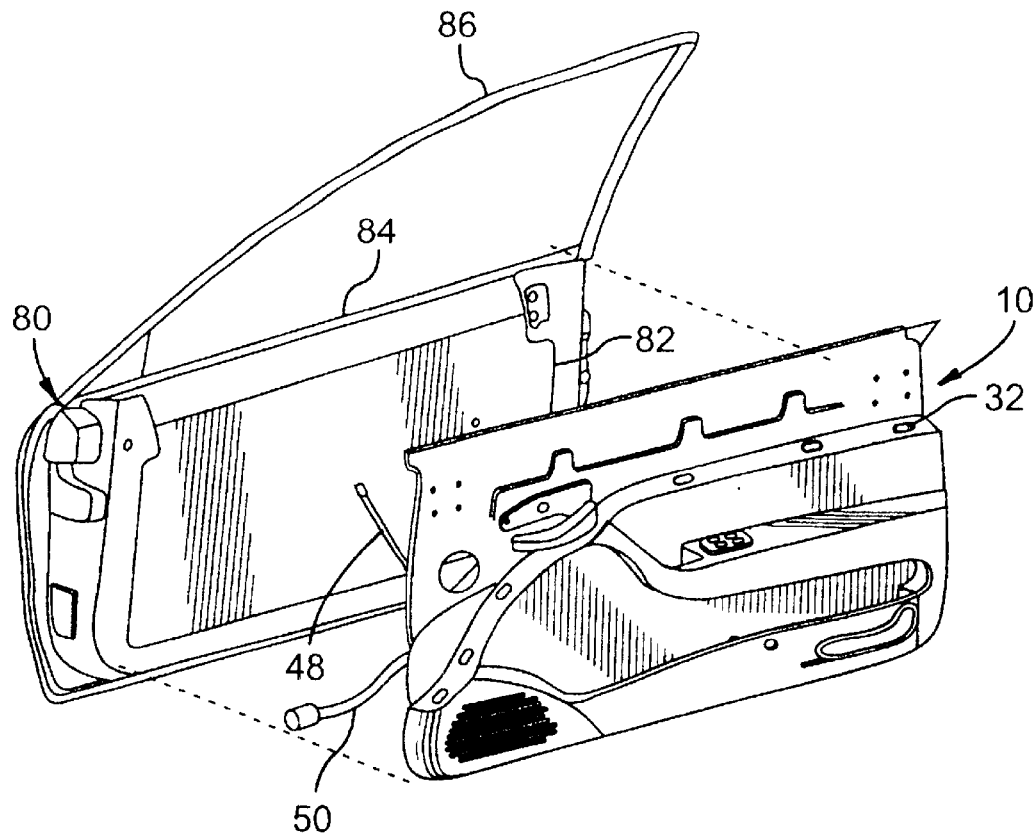
FIG. 6 is an exploded perspective view of the door module embodiment of FIG. 1 being assembled to a door frame.
Figure 7:
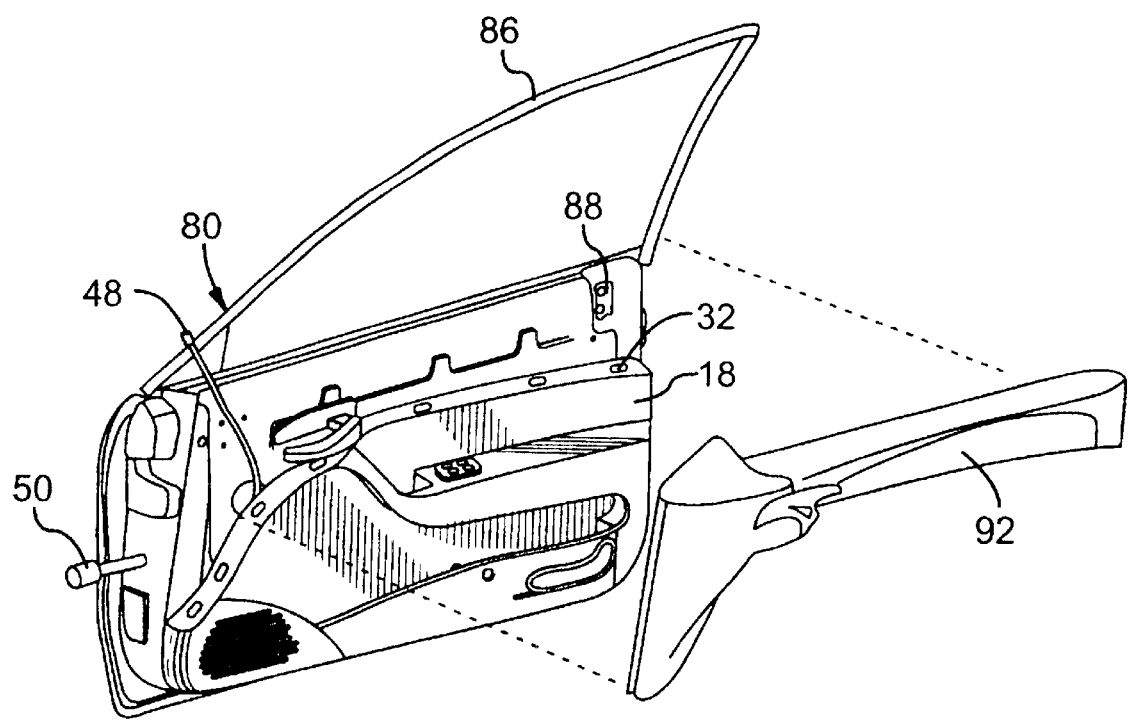
FIG. 7 is an exploded view of the door module embodiment of FIG. 1 being assembled with an upper door trim.

Referring to FIGS. 6 and 7, the final assembly of the door module is illustrated. The door module 10 is presented to the door frame 80 which comprises an inner panel 82 and an outer panel 84. Main connection 50 is threaded through an opening in the end of the inner door panel 82 for connection to the main electrical system of the vehicle. The mirror connection 48 is threaded through the aperture 72 for presentation and connection to the mirror (not illustrated). The glass 16 is positioned to run in the window channels on the inner periphery of the window frame 86. Once aligned, the door module 10 is fastened to the inner panel 82 using suitable fasteners. In particular, the upper panel 62 is fastened at 88 and 90 to the inner panel 82. Upper trim panel 92, which includes an inner weather seal 93, is then fastened to the lower trim panel 18 by inserting a suitable clip into access holes 32. Additional fasteners could be used to join the trim panel 18 to the door frame 80.

Alternatively, door module 10 can be shipped to the assembly line as a single module and separated prior to installation. The carrier plate (54), including the window regulator assembly 60 is installed in the manner described above. In this condition, access to the inner cavity of the door is provided between the legs 64, 66. The trim sub-module 12 can then be installed and connected to the carrier plate 54 after threading the connectors of the wiring harness through the respective openings in the door.

Figure 8:
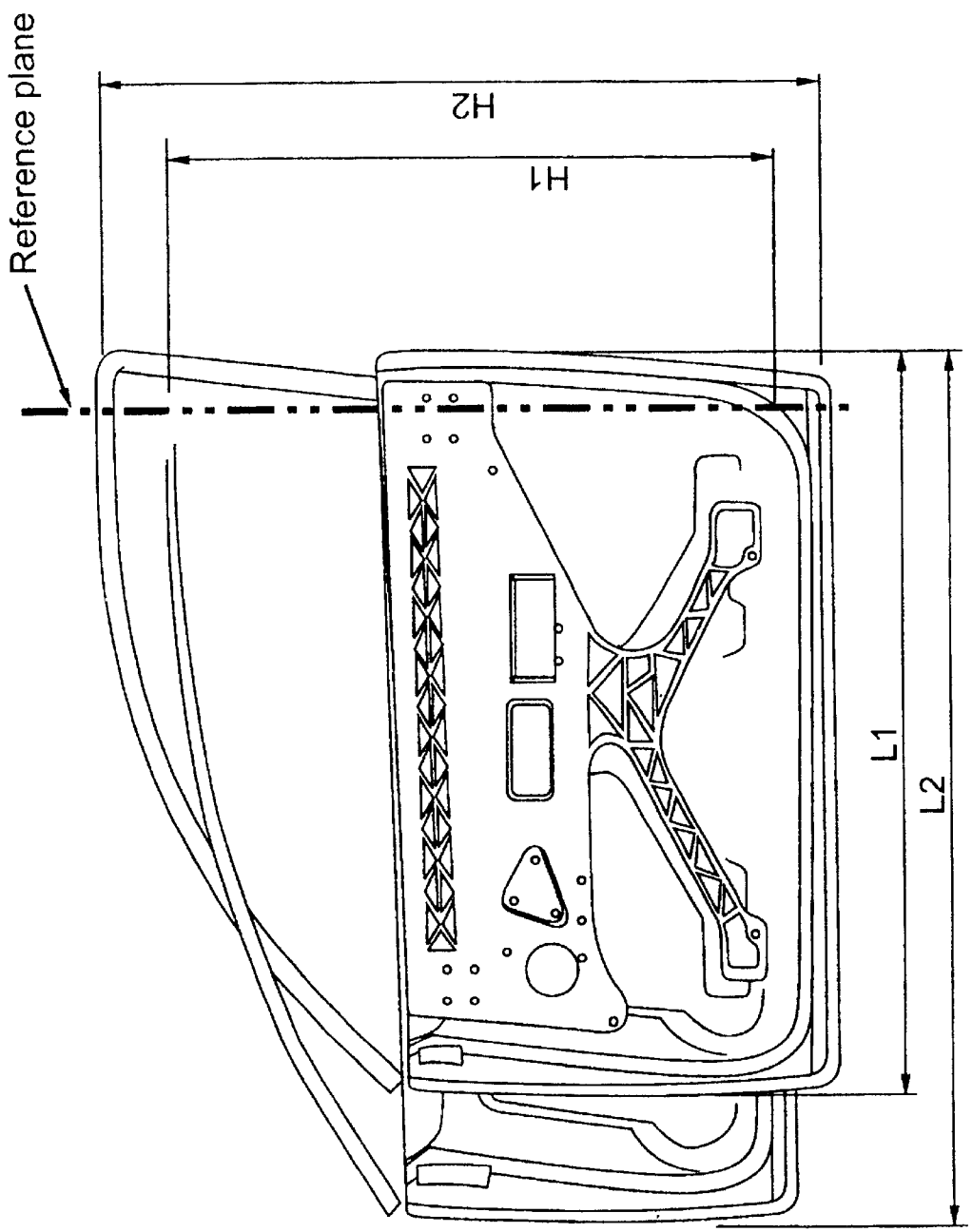
FIG. 8 is side elevational view of a carrier plate of the door module embodiment of FIG. 1 as applied to different vehicle door types.

Referring to FIG. 8, some of the advantages of the present invention are illustrated. The hardware module 14, 114 can be manufactured to a base size. The trim sub-module 12 is unique to each vehicle. Thus, the same hardware sub-module 14 can be used for different vehicles on the same or different platforms. Particularly, the hardware sub-module 14, 114 can be fitted on a sedan or sport wagon which is characterized by long low profile door (L2, H1) or alternatively a sport utility vehicle which is characterized by a short high profile door (L1, H2). By sizing the speaker bracket, the speaker can be located in a desired design position for any particular door.

The above-described embodiment of the invention is intended to be an example of the present invention and alterations and modifications may be effected thereto, by those of skill in the art, without departing from the scope of the invention as defined in the appending claims.

What is claimed is:

1. A vehicle door module (10) comprising:
   a hardware sub-module (14, 114) including a structural carrier plate (54) containing hardware mounting surfaces, the carrier plate (54) having an upper body panel (62) and a bifurcated lower body portion comprising two legs (64, 66) extending from the upper body panel in opposite directions, door hardware (56, 58) mounted on said mounting surfaces, and a window regulator assembly (60) mounted on said structural carrier plate (54), and
   a trim sub-module (12) mounted to said hardware sub-module, said trim sub-module (12) comprising a trim panel (18), a water barrier (24) film and a wiring harness, said water barrier film contoured to extend about and seal a periphery of the trim panel (18), a portion of said wire harness (26) being sealed to the water barrier (24) and said wiring harness having connectors extending from said trim sub-module (12) at predetermined locations.

2. A vehicle door module according to claim 1 wherein said trim sub-module (12) further comprises a speaker mount bracket (20) attached to said trim panel (18), a speaker (22) mounted to said bracket (20) and operatively connected to said wiring harness (26), said speaker mount bracket (20) positioning said speaker (22) in a juxtaposition to a speaker grill (30) in said trim panel and connected to said carrier plate (54) after the trim sub-module (12) is mounted to said hardware sub-module (14, 114).

3. A vehicle door module according to claim 2, wherein said water barrier (24) has an opening (40) for receiving said speaker (22) and said water barrier (24) is sealed about said opening (40).

4. A vehicle door module according to claim 3, wherein said trim sub-module (12) further comprises a courtesy light (36) mounted to said trim panel (18) and operatively connected to said wiring harness (26).

5. A vehicle door module according to claim 4, wherein said two legs (64, 66) are L-shaped and support a lower portion of said trim sub-module (12).

6. A Vehicle door module according to claim 5, wherein said window regulator assembly (60) includes a pair of spaced parallel rails (74, 76) and said two L-shaped legs (64, 66) support lower ends of said parallel rails (74, 76).

7. A vehicle door module according to claim 6, wherein said carrier plate (54) is a stamped sheet metal.

8. A vehicle door module according to claims 1 or 6 wherein said carrier plate (54) is cast from a magnesium alloy and said pair of spaced parallel rails (74, 76) are integrally formed to said carrier plate (54).

9. A vehicle door module according to claim 8 further including an upper trim panel (92) mounted to said carrier plate (54) and positioned to cover a peripheral area of the carrier plate (54).

10. A vehicle door module according to claim 8, wherein said door hardware comprises a door latch (58) operatively connected to an inside release handle (56) and said wiring harness.

11. A vehicle door module according to claim 8, wherein said wiring harness is sealed to the water barrier by an impermeable cover sheet (52).

12. A vehicle door module according to claim 8, wherein said module further comprises a glass panel (16) mounted to said window regulator assembly (60).

13. A vehicle door module according to claim 2, wherein said trim sub-module (12) further comprises a switch (34) mounted on said trim panel (18) and operatively connected to said wiring harness (26).

* * * * *